United States Patent [19]

McPhee

[11] 4,181,549
[45] Jan. 1, 1980

[54] SOLVENT-BONDED JOINT AND METHOD OF MAKING THE SAME

[75] Inventor: Charles J. McPhee, Sylmar, Calif.

[73] Assignee: American Hospital Supply Corporation, Evanston, Ill.

[21] Appl. No.: 776,435

[22] Filed: Mar. 10, 1977

[51] Int. Cl.² .................. C09J 5/00; B29C 27/10; F16L 13/10
[52] U.S. Cl. ..................... 156/146; 128/247; 156/69; 156/145; 156/294; 156/305; 285/21
[58] Field of Search .............. 156/69, 294, 304, 305, 156/145, 146; 285/21; 128/247

[56] References Cited

U.S. PATENT DOCUMENTS

| | | | |
|---|---|---|---|
| 2,584,095 | 1/1952 | Slaughter | 156/69 |
| 2,661,500 | 12/1953 | Seymour et al. | 156/69 X |
| 2,788,834 | 4/1957 | Slaughter | 156/305 X |
| 3,278,357 | 10/1966 | Gettig et al. | 156/294 |
| 3,728,184 | 4/1973 | Burke et al. | 156/73.1 |
| 3,784,235 | 1/1974 | Kessler et al. | 285/21 |
| 3,795,558 | 3/1974 | Dabney et al. | 156/73.1 |
| 3,920,787 | 11/1975 | McDowell et al. | 264/263 |

Primary Examiner—John T. Goolkasian
Assistant Examiner—Robert A. Dawson
Attorney, Agent, or Firm—Tilton, Fallon, Lungmus & Chestnut

[57] ABSTRACT

A solvent-bonded joint between plastic members, and a method of making the same, particularly useful where such members are intended to convey fluids such as sterile medical solutions. The joint includes a pair of members joined at a zone of interference, a tapered crevice between the members, and a solvent bond in the tapered crevice. After the members have been fitted together, the solvent is introduced into the tapered well or crevice leading to the zone of interference to form the permanent solvent bond. The zone of interference serves as a barrier against any liquid or other flowable material entering the tapered crevice in the opposite direction prior to formation of the solvent bond and further serves as a barrier against the escape of solvent through the crevice, or the contamination by solvent of any material or parts beyond or below the crevice.

21 Claims, 6 Drawing Figures

U.S. Patent  Jan. 1, 1980  4,181,549
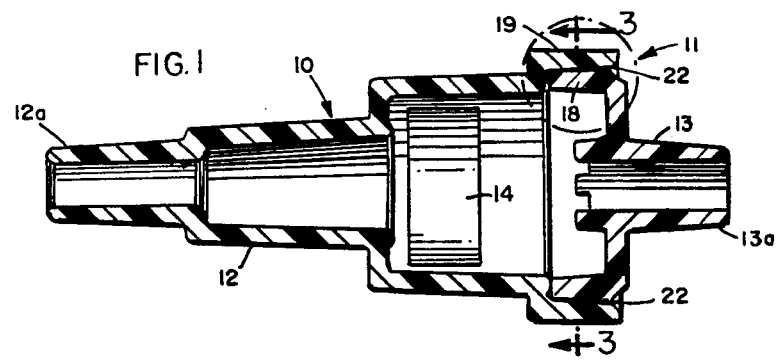
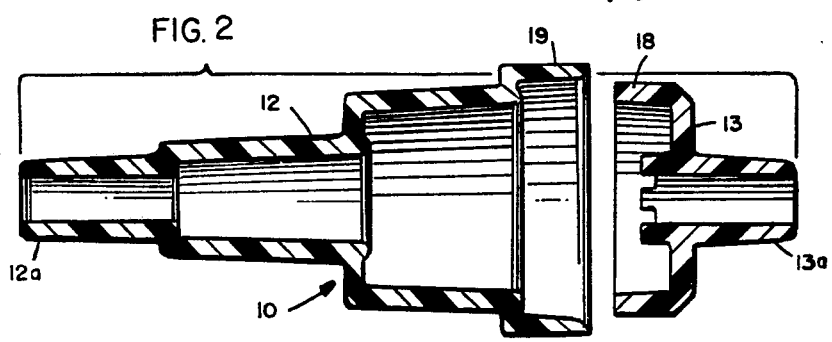
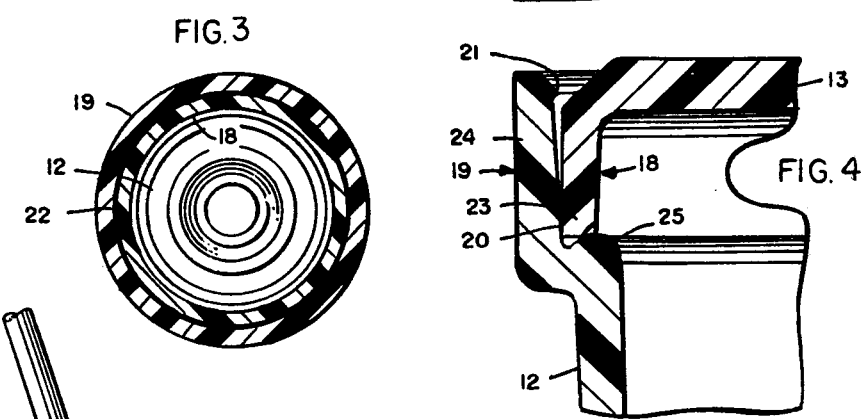
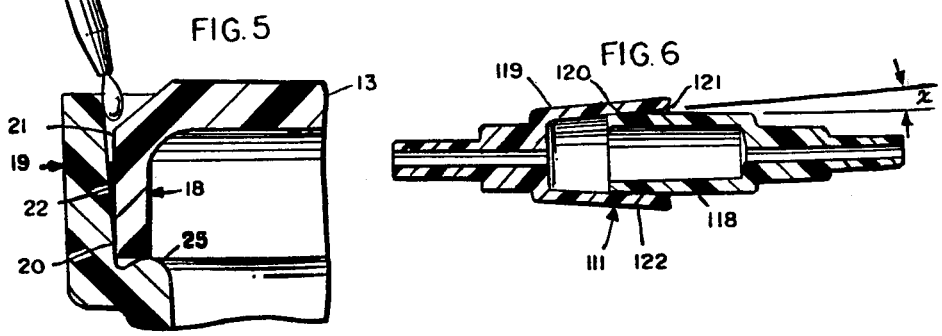

SOLVENT-BONDED JOINT AND METHOD OF MAKING THE SAME

BACKGROUND

Various methods have been used in the past for permanently joining plastic parts in fluid-tight sealing relation, including heat sealing and solvent-bonding techniques. Heat sealing, although widely used, ordinarily requires elaborate supports and operating mechanisms to achieve reliability and production volume in the assembly of relatively small plastic parts such as, for example, filter housing, couplings, port assemblies, and other elements and assemblies commonly used in medical equipment.

Solvent sealing, which ordinarily involves coating one of the parts with solvent before the two parts are fitted together, is suitable for some operations but has severe limitations for volume production. Parts once coated must be immediately assembled; it is not feasible, for example, to coat successively a multiplicity of parts and then assemble them in a batch-type operation. Also, in those cases where one of the parts contains (or communicates with) a liquid, the usual solvent coating and fitting operations are not only awkward and unwieldly, but present risks of liquid interfering with proper solvent bonding and, even more important, of small amounts of solvent invading the liquid-containing compartment. It is apparent that any contact between the liquid or solvent is undesirable and, especially if it might result in contamination of the liquid (such as parenteral fluid), must be strictly avoided.

SUMMARY

An important aspect of this invention lies in the discovery that the shortcomings of conventional solvent-bonding techniques might be overcome by pre-assembling the parts to form a temporary liquid-tight seal, and then introducing any appropriate solvent for the plastic materials involved into a gradually-tapered crevice leading to that seal, the solvent flowing into and being retained within the crevice by a capillary action. The temporary seal serves as a barrier to block the extent of capillary flow of the solvent and, in those cases where a liquid, such as a parenteral solution, is disposed on the other side of that barrier, the interference fit prevents contact between such a liquid and the solvent. Furthermore, because of the capillary action, solvent introduced into the crevice will remain in that crevice even though the parts are handled and oriented at random. Unlike prior solvent-welding techniques, the method of this invention permits pre-assembly of a multiplicity of parts and, after all have been assembled, solvent may then be applied to each assembled pair to complete the solvent-welding process.

The solvent joint of the present invention involves a pair of plastic members frictionally engagable in a liquid-tight zone of interference, a tapered crevice between the members leading to the zone of interference with the zone of interference serving as a barrier against fluid (gas or liquid) flow in either direction through the apex of the tapered crevice, and a permanent solvent bond between the members in at least the base of the tapered crevice. The members are preferably tubular with one of the members receiving the other in telescoping or overlapping relationship. The overlapping portions of the members should converge at an angle within the general range of 1 to 20 degrees to define the tapered crevice, the preferred range being about 2 to 6 degrees. The receiving member may, if desired, have an internal annular shoulder engaged by the end of the inserted plastic tubular member, especially if the internal diameters of the joined parts is to be substantially the same, or where the outer plastic member is formed of stretchable material and the shoulder might therefore be useful as a stop to limit the extent of insertion of the other member.

The method of the present invention includes forming two plastic members for frictional engagement in a fluid-tight zone of interference with a tapered crevice leading to that zone of interference, fitting the members together in preliminary sealing engagement with the zone of interference serving as a barrier against fluid flow, and introducing a solvent into the tapered crevice to form a permanent solvent bond between the parts. Where one of the parts is associated with a body of liquid or other flowable material (as, for example, where such part constitutes the neck of a liquid-containing plastic bag), the frictional seal blocks such material from flowing into the crevice through its apical end and from interfering with the subsequent formation of a solvent bond, and later, after solvent is introduced, prevents such solvent from entering the material-containing chamber and possibly contaminating that material.

It is therefore an additional object of the present invention to provide a solvent-bonded plastic joint and method of making the same for carrying a flowable material such as a sterile medical liquid suitable for use in surgery or for administration to a patient. The provision of the structure and the realization of the advantages derived therefrom constitute additional important objects of this invention. Other objects of the present invention can be appreciated from the details of construction and operation set forth in the accompanying specification, claims, and drawings.

DRAWINGS

FIG. 1 is an axial cross sectional view of a medical liquid flow control chamber utilizing the solvent-bonded joint and method of making same in accordance with the present invention.

FIG. 2 is an axial cross sectional view of the chamber of FIG. 1 showing the joint of the present invention with the parts of the chamber separated and the valve member omitted.

FIG. 3 is a transverse cross sectional view of the chamber of FIG. 1 showing the joint of the present invention taken along line 3—3 of FIG. 1.

FIG. 4 is an enlarged cross sectional view of a portion of the chamber of FIG. 1 (as indicated by a circle) showing the joint of the present invention before introduction of a solvent to form a solvent bond.

FIG. 5 is an enlarged cross sectional view of a portion of the chamber of FIG. 1 showing the joint of the present invention during introduction of the solvent to form the solvent bond.

FIG. 6 is an axial cross sectional view of an alternative solvent-bonded joint and method of making same in accordance with the present invention.

DESCRIPTION

In the illustration given and with reference first to FIG. 1, the numeral 10 generally designates a plastic housing or chamber having a joint 11 formed in accordance with the present invention. Chamber 10 is generally annular in configuration and includes a main body portion 12 and closure portion 13. The chamber or housing is intended for controlling the flow of medical liquids and, for that purpose, contains a float valve 14 (shown only in FIG. 1).

Joint 11 has been shown operatively associated with the chamber 10 primarily for purposes of illustrating one of many advantageous applications of the present invention. The details of construction of the chamber 10 are therefore not believed to be important for purposes of obtaining a thorough and proper understanding of the inventive concepts. Accordingly, the joint of the following description is equally well suited for joining plastic members of many different configurations within the contemplation of the present invention.

Joint 11 comprises a pair of plastic members generally designated 18 and 19 which are frictionally engagable (as shown in FIG. 4) in a liquid-tight zone of interference 20. A tapered crevice 21 is provided between the plastic members 18 and 19 leading to the zone of interference 20. The zone of interference 20 serves as a barrier against fluid transmission prior to and during formation of a solvent bond.

A solvent bond 22 is provided between the plastic members 18 and 19 in the tapered crevice 21 by using any of a number of well known plastic solvents such as, for example, cyclohexanone or tetrahydrofuran. As used herein, the term "solvent" means any liquid bonding agent which has some capability of dissolving or softening the plastic material from which the housing is formed, even though such agent may also contain fillers or other ingredients which have no such properties. Thus, a bodied solvent, or a cement having a liquid medium which is also a solvent for the plastic of the housing, is regarded as a solvent within the meaning of this application.

The zone of interference 20 serves as a barrier against the flow of solvent through the apex of the crevice where it might otherwise contact the valve member 14 (and impair its subsequent functioning) or contact liquid or other material that might lie beyond the apex of the crevice. It should be emphasized that either or both of the outlets 12a and 13a for the housing sections 12 and 13 may be connected to material-containing elements (i.e., tubulature, bags, bottles, etc.) prior to the solvent bonding procedure described herein without danger that solvent might later flow beyond the apex of the crevice and contaminate the interior of chamber 10, the interior of any parts with which the chamber communicates, or the flowable contents (liquid or solid) thereof, and conversely, without danger that such flowable material might enter the crevice through the apex thereof, after the parts have been frictionally connected, and interfere with the formation of an effective solvent bond.

The plastic members 18 and 19 are preferably formed having generally tubular configurations. Member 18 has an end 23 adapted for frictional engagement at the zone of interference 20 with an end 24 of the member 19. The end 24 of the member 19 telescopically receives the end 23 of the member 18 in overlapping relationship. As shown in FIGS. 4 and 5, the end portion 24 merges with the remainder of member 19 along an annular shoulder 25, member 18 being inserted into the member 19 into abutting relation with that shoulder.

The overlapping portion of the receiving member 19 forms an angle of about 1 to 20 degrees with respect to the overlapped portion of the telescoping member 18, the preferred range being about 2 to 6 degrees. Thus, in the best mode presently known for practicing the invention, the inner or telescoping member 18 may be tapered at an angle of 1 to 3 degrees with respect to its axis and the receiving member 19 may be tapered at an angle of 1 to 3 degrees with respect to its axis. The resulting angle of 2 to 6 degrees will then provide the taper of the solvent-receiving crevice.

Since an interference fit is formed between the plastic parts, both such parts, and especially the telescoping inner member 18, should ordinarily be formed of a rigid or semi-rigid plastic such as polystryene, vinyl propylene copolymer, cellulose acetate, cellulose nitrate, or acrylic copolymers. Other solvent-bondable plastics having similar properties may of course be used. It is also to be understood that relatively flexible plastics such as plasticised polyvinylchloride might in some instances be used, especially if the parts are formed to provide a crevice having an angle of taper nearer the upper limits of the specified range.

In practicing the method of this invention, the plastic members are first fitted together to define the tapered crevice leading to the zone of interference, thereby forming a preliminary seal to block fluid migration and, where necessary, prevent liquid or other flowable material below or beyond the crevice from contacting the walls of that crevice. Thereafter, the solvent is introduced into the crevice, where it spreads and penetrates by a wicking or capillary action, to soften the plastic within the crevice and, upon evaporation, leave the parts permanently fused or bonded together.

The capillary action also serves to retain the solvent within the crevice even if, for example, the parts should be inverted (with the mouth of the crevice facing downwardly) after solvent introduction. Therefore, during production, a substantial number of parts may be preassembled and solvent may then be introduced into the crevice (or crevices) of each assembly without fear that solvent might escape if the treated assemblies are thereafter oriented in random fashion.

Referring to FIG. 6, an alternative joint 111 and method of making the same in accordance with the present invention is illustrated. The joint 111 includes a pair of plastic members 118 and 119 frictionally engagable in a liquid-tight zone of interference 120. A tapered crevice 121 having a taper x within the outside range as specified is provided between the plastic members 118 and 119 leading to the zone of interference 120 with the zone of interference 120 serving as a barrier against liquid or other flowable material entering the tapered crevice 121 prior to formation of a solvent bond and serving as a barrier against contact between the solvent and such material during formation of a solvent bond. A solvent bond 122 is then formed between the plastic members 118 and 119 in the tapered crevice 121 adjacent the zone of interference 120. The joint 111 so constructed is equally well suited for carrying a liquid in a leak-proof, contamination-proof manner.

The method of the present invention therefore produces a fluid-tight joint in two stages. The first stage consists in forming a snug frictional fit between the members which temporarily secures the parts together and which forms a preliminary liquid-tight seal; the second stage lies in utilizing a wicking action to introduce and retain solvent on one side of the fluid-tight seal and to produce a solvent bond between the members which permanently cooperates with the frictional fit to prevent contamination or leakage of liquid and other flowable materials supported in or later carried by the parts. Also, since two stages are involved, precise mechanical positioning or interfitting of the parts can be accomplished (and checked) before bonding is undertaken. Once the proper mechanical relationship is established, the frictional interfit functions to hold the parts in their proper positions until the solvent is introduced and the bonding operation is completed.

While in the foregoing specification, a detailed description of the invention has been set forth for the purpose of illustration, variations of the details herein given may be made by those skilled in the art without departing from the spirit and scope of the invention.

I claim:

1. The method of joining two plastic members comprising forming said members for frictional engagement therebetween in a fluid-tight zone of interference with a tapered crevice leading to said zone of interference, fitting said members together in frictional engagement with said zone of interference serving as a fluid-tight barrier, and introducing a solvent into said crevice at a point remote from said zone of interference to form a solvent bond with said zone of interference serving as a barrier against contact between said solvent and any flowable material or objects on the opposite side of said zone.

2. The method of claim 1 in which said members are tubular and in which an end of one of said members telescopically receives an end of the other of said members in overlapping relationship.

3. The method of claim 2 in which the overlapping portions of said members define said tapered crevice and said end of said telescoping member frictionally engages said end of said receiving member at said zone of interference.

4. The method of claim 3 in which the overlapping portion of said receiving member forms an angle of 1 to 20 degrees with respect to the overlapped portion of said telescoping member.

5. The method of claim 4 in which said angle falls within the range of about 2 to 6 degrees.

6. The method of claim 3 in which said tapered crevice is an annular recess for receiving said solvent to form said solvent bond adjacent said zone of interference.

7. The method of claim 6 in which said solvent flows through said annular recess to said zone of interference to form said solvent bond by capillary action.

8. The method of claim 6 in which said members are formed of relatively rigid plastic.

9. The method of joining two plastic members comprising forming said members for frictional engagement therebetween in a liquid-tight zone of interference with a crevice leading to said zone of interference, fitting said members together in frictional engagement with said zone of interference serving as a liquid-tight barrier, and introducing a solvent into said crevice from one side of said zone of interference while a liquid is disposed on the opposite side of said zone to form a solvent bond with said zone of interference serving as a barrier against contact and cross contamination between said solvent and liquid.

10. The method of claim 9 in which said members are tubular and in which an end of one of said members telescopically receives an end of the other of said members in overlapping relationship.

11. The method of claim 10 in which said crevice is tapered.

12. The method of claim 11 in which the overlapping portions of said members define said tapered crevice and said end of said telescoping member frictionally engages said end of said receiving member at said zone of interference.

13. The method of claim 12 in which the overlapping portion of said receiving member forms an angle of 1 to 20 degrees with respect to the overlapping portion of said telescoping member.

14. The method of claim 13 in which said angle falls within the range of about 2 to 6 degrees.

15. The method of claim 12 in which said tapered crevice is an annular recess for receiving said solvent to form said solvent bond adjacent said zone of interference.

16. The method of claim 15 in which the overlapping portion of said receiving member forms an angle of 1 to 3 degrees with respect to its axis and the overlapping portion of said telescoping member forms an angle of 1 to 3 degrees with respect to its axis, whereby, the overlapping portion of said receiving member forms an angle of 2 to 6 degrees with respect to the overlapping portion of said telescoping member.

17. The method of claim 15 in which the overlapping portion of said receiving member is provided with an annular shoulder and said telescoping member is inserted into said receiving member in abutting relation with said shoulder.

18. The method of claim 15 in which said solvent flows through said annular recess to said zone of interference to form said solvent bond by capillary action.

19. The method of claim 15 in which said members are formed of relatively rigid plastic.

20. The method of joining two plastic members comprising forming said members for frictional engagement therebetween in a fluid-tight zone of interference with a tapered crevice leading to said zone of interference, said members being tubular with an end portion of one of said members telescopingly receiving an end portion of the other of said members in overlapping relationship and with said overlapping portions defining said tapered crevice and said end portion of the telescoping member frictionally engaging said end portion of the receiving member at said zone of interference, fitting said members together in frictional engagement with said zone of interference serving as a fluid-tight barrier, said overlapping portion of said receiving member forming an angle of 1 to 3 degrees with respect to its axis and the overlapping portion of said telescoping member forming an angle of 1 to 3 degrees with respect to its axis, whereby, the overlapping portion of said receiving member forms an angle of 2 to 6 degrees with respect to the overlapping portion of said telescoping member, and introducing a solvent into said tapered crevice to form a solvent bond with said zone of interference serving as a barrier against contact between said solvent and any flowable material or objects on the opposite side of said zone, said tapered crevice comprising an annular recess for receiving said solvent to form said solvent bond adjacent said zone of interference.

21. The method of joining two plastic members comprising forming said members for frictional engagement therebetween in a fluid-tight zone of interference with a tapered crevice leading to said zone of interference, said members being tubular with an end portion of one of said members telescopingly receiving an end portion of the other of said members in overlapping relationship and with said overlapping portions defining said tapered crevice and said end portion of the telescoping member frictionally engaging said end portion of the receiving member at said zone of interference, said overlapping portion of said receiving member being provided with an annular shoulder, fitting said members together in frictional engagement with said zone of interference serving as a fluid-tight barrier and with said telescoping member being inserted into said receiving member in abutting relationship with said shoulder, and introducing a solvent into said crevice to form a solvent bond with said zone of interference serving as a barrier against contact between said solvent and any flowable material or objects on the opposite side of said zone, said tapered crevice comprising an annular recess for receiving said solvent to form said solvent bond adjacent said zone of interference.

* * * * *